United States Patent
Pal (10) Patent No.: US 10,040,450 B1
(45) Date of Patent: Aug. 7, 2018

(54) METHOD OF CONTROLLING AN AUTONOMOUS VEHICLE AND A COLLISION AVOIDANCE DEVICE THEREOF

(71) Applicant: Wipro Limited, Bangalore (IN)

(72) Inventor: Shyam Sundar Pal, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 33 days.

(21) Appl. No.: 15/463,955

(22) Filed: Mar. 20, 2017

(30) Foreign Application Priority Data

Mar. 13, 2017 (IN) .............................. 201741008652

(51) Int. Cl.
  *B60W 30/09* (2012.01)
  *G08G 1/16* (2006.01)
  (Continued)

(52) U.S. Cl.
  CPC ............ *B60W 30/09* (2013.01); *B60W 10/04* (2013.01); *B60W 10/20* (2013.01); *G01C 21/3415* (2013.01); *G05D 1/0088* (2013.01); *G08G 1/165* (2013.01); *G08G 1/166* (2013.01); *B60W 2420/42* (2013.01); *B60W 2550/10* (2013.01); *B60W 2710/20* (2013.01); *B60W 2720/10* (2013.01)

(58) Field of Classification Search
  CPC ... G08G 1/161; G08G 1/166; B60W 30/0953; B60W 50/14
  See application file for complete search history.

(56) References Cited

U.S. PATENT DOCUMENTS 7,979,174 B2    7/2011   Fregene et al.
8,948,955 B2    2/2015   Zhu et al.
(Continued)

OTHER PUBLICATIONS

"Today's Autonomous Vehicle Systems", 3 Autonomy Technology: Capabilites and Potential, Autonomous Vehicles in Support of Naval Operations (2005), The National Academies Press, Retrieved from: https://www.nap.edu/read/11379/chapter/5#46.
(Continued)

*Primary Examiner* — Yonel Beaulieu
*Assistant Examiner* — Martin A Weeks
(74) *Attorney, Agent, or Firm* — Finnegan, Henderson, Farabow, Garrett & Dunner, LLP (57) ABSTRACT

Method of controlling an autonomous vehicle and a collision avoidance device thereof are disclosed. The method includes gathering obstacle information associated with an obstacle around a current navigation path of the autonomous vehicle and vehicle information associated with the autonomous vehicle. The method further includes determining a relative velocity and a collision distance between the obstacle and the autonomous vehicle and an obstacle state of the obstacle based on an analysis of the obstacle information and the vehicle information. The method includes computing a collision factor based on the relative velocity and the obstacle state. When the collision factor is above a collision threshold, the method further includes stopping the autonomous vehicle before exhausting the collision distance, when at least one alternate navigation path is not available and modifying the current navigation path of the autonomous vehicle, when the at least one alternate navigation path is available.

20 Claims, 7 Drawing Sheets

(51) Int. Cl.
  *G01C 21/34* (2006.01)
  *B60W 10/04* (2006.01)
  *B60W 10/20* (2006.01)
  *G05D 1/08* (2006.01)
  *G05D 1/00* (2006.01)

(56) References Cited

U.S. PATENT DOCUMENTS

| | | |
|---|---|---|
| 2004/0155811 A1 | 8/2004 | Albero et al. |
| 2004/0193351 A1 | 9/2004 | Takahashi et al. |
| 2004/0193374 A1* | 9/2004 | Hac .................... B60K 31/0008 701/301 |
| 2008/0150786 A1* | 6/2008 | Breed .................. B60N 2/2863 342/53 |
| 2011/0178710 A1 | 7/2011 | Pilutti et al. |
| 2011/0224892 A1* | 9/2011 | Speiser ................... G08G 1/01 701/118 |
| 2014/0032094 A1* | 1/2014 | Heinrichs-Bartscher . B60T 7/22 701/301 |
| 2016/0125746 A1 | 5/2016 | Kunzi et al. |
| 2017/0008518 A1* | 1/2017 | Arndt ..................... B60W 30/09 |
| 2017/0043768 A1 | 2/2017 | Prokhorov |
| 2017/0098372 A1* | 4/2017 | Eilertsen .......... G08G 1/096775 |
| 2017/0101093 A1* | 4/2017 | Barfield, Jr. ........ B60W 30/095 |

OTHER PUBLICATIONS

Gummadi, V., "Driverless cars. What's their future on India's chaotic roads?" Retrieved from: https://www.linkedin.com/pulse/driverless-cars-boon-bane-india-its-future-vijay-gummadi and https://www.nap.edu/read/11379/chapter/5#46, Sep. 27, 2015.

Extended European Search Report issued in the European Patent Office in counterpart European Application No. 17178882.1, dated Nov. 8, 2017, 7 pages.

* cited by examiner

METHOD OF CONTROLLING AN AUTONOMOUS VEHICLE AND A COLLISION AVOIDANCE DEVICE THEREOF

TECHNICAL FIELD

This disclosure relates generally to autonomous vehicles and more particularly to a method of controlling an autonomous vehicle and a collision avoidance device thereof.

BACKGROUND

With advent of technology, there has been an increased push to replace manually driven vehicles with semi or fully autonomous vehicles. Autonomous vehicles use different mechanisms to ply on roads or different terrains, while avoiding collision with various obstacles, which may include other vehicles, people, permanent structures, and the like. The autonomous vehicles may be controlled based on characteristics of nearby obstacles and surrounding environment.

Conventional autonomous vehicles determine vehicle speed such that it stops in time to avoid obstacles on a current planned navigation path, however, it does not provide mechanism to avoid an obstacle by altering a current planned navigation path. Moreover, the conventional autonomous vehicles also fail to provide mechanism to avoid or overcome an obstacle that has dynamic characteristics (for example, shape, location, speed, and direction of movement) by controlling speed and modifying the current planned navigation path.

SUMMARY

In one embodiment, a method of controlling an autonomous vehicle is disclosed. The method includes gathering, by a collision avoidance device, obstacle information associated with an obstacle around a current navigation path of the autonomous vehicle and vehicle information associated with the autonomous vehicle; determining, by the collision avoidance device, a relative velocity and a collision distance between the obstacle and the autonomous vehicle and an obstacle state of the obstacle based on an analysis of the obstacle information and the vehicle information; computing, by the collision avoidance device, a collision factor based on the relative velocity and the obstacle state; stopping the autonomous vehicle, by the collision avoidance device, before exhausting the collision distance, when the collision factor is above a collision threshold and at least one alternate navigation path is not available; and modifying, by the collision avoidance device, the current navigation path of the autonomous vehicle, when the collision factor is above the collision threshold and the at least one alternate navigation path is available.

In another embodiment, a collision avoidance device for controlling an autonomous vehicle is disclosed. The collision avoidance device includes a processor and a memory communicatively coupled to the processor, wherein the memory stores processor instructions, which, on execution, causes the processor to gather obstacle information associated with an obstacle around a current navigation path of the autonomous vehicle and vehicle information associated with the autonomous vehicle; determine a relative velocity and a collision distance between the obstacle and the autonomous vehicle and an obstacle state of the obstacle based on an analysis of the obstacle information and the vehicle information; compute a collision factor based on the relative velocity and the obstacle state; stopping the autonomous vehicle, by the collision avoidance device, before exhausting the collision distance, when the collision factor is above a collision threshold and at least one alternate navigation path is not available; and modify the current navigation path of the autonomous vehicle, when the collision factor is above the collision threshold and the at least one alternate navigation path is available.

In yet another embodiment, a non-transitory computer-readable storage medium having stored thereon, a set of computer-executable instructions causing a computer including one or more processors to perform steps including: gathering, by a collision avoidance device, obstacle information associated with an obstacle around a current navigation path of the autonomous vehicle and vehicle information associated with the autonomous vehicle; determining, by the collision avoidance device, a relative velocity and a collision distance between the obstacle and the autonomous vehicle and an obstacle state of the obstacle based on an analysis of the obstacle information and the vehicle information; computing, by the collision avoidance device, a collision factor based on the relative velocity and the obstacle state; stopping the autonomous vehicle, by the collision avoidance device, before exhausting the collision distance, when the collision factor is above a collision threshold and at least one alternate navigation path is not available; and modifying, by the collision avoidance device, the current navigation path of the autonomous vehicle, when the collision factor is above the collision threshold and the at least one alternate navigation path is available.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
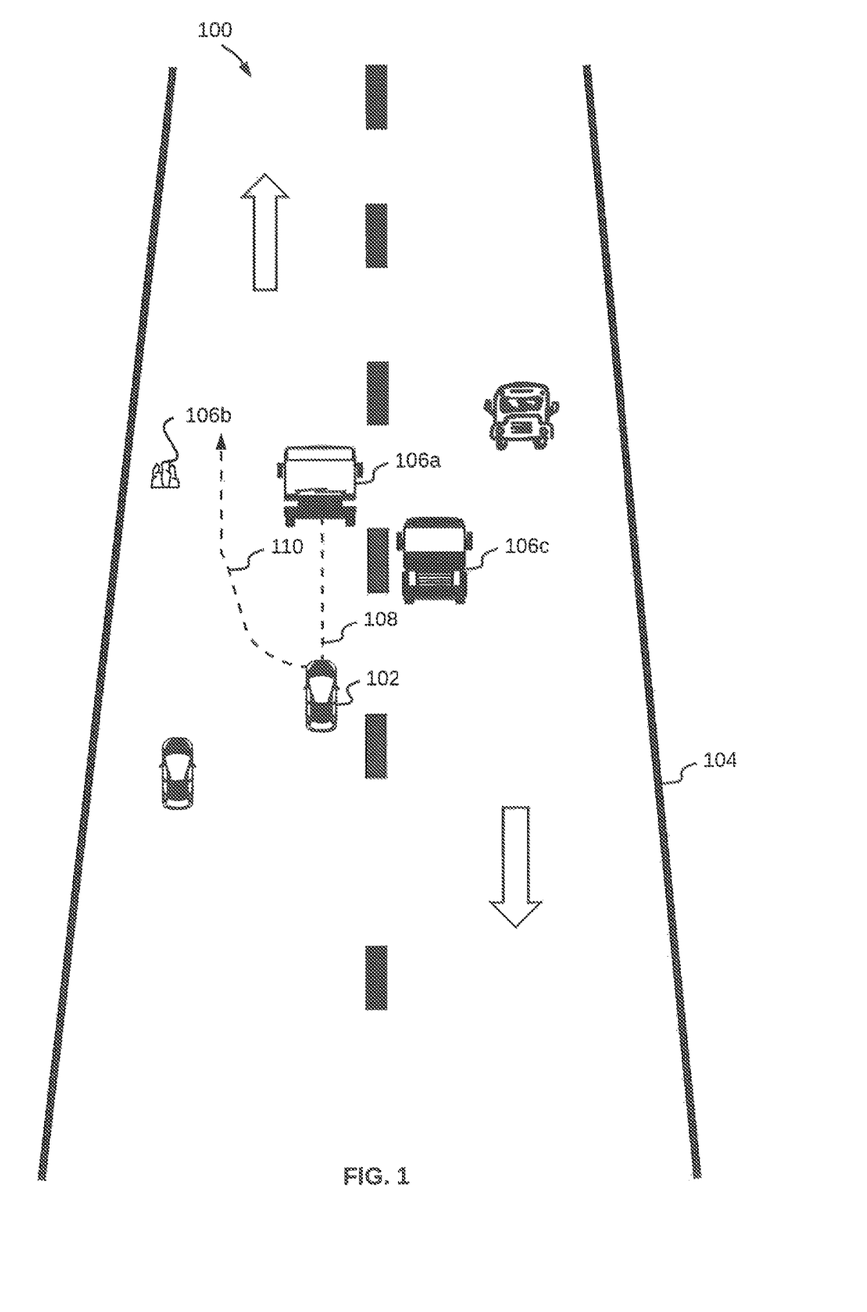
FIG. 1 illustrates an exemplary environment in which various embodiments may be employed.

Referring to FIG. 1, an exemplary environment 100 in which various embodiments may be employed, is illustrated. Environment 100 illustrates an autonomous vehicle 102 driving through a road 104. Examples of autonomous vehicle 102 may include, but are not limited to a car, a van, a sports utility vehicle, a multi utility vehicle, a bus, a minibus, or a truck. While driving through road 104, there might be an obstacle 106a, an obstacle 106b, and an obstacle 106c, which may be collectively referred to as obstacles 106 around autonomous vehicle 102, either on the current navigation path of autonomous vehicle 102 or on adjacent navigation paths. By way of an example, obstacle 106a may be a bus plying ahead of autonomous vehicle 102 on a current navigation path 108, obstacle 106b may be a boulder lying on one of the adjacent navigation paths, and obstacle 106c may be an oncoming vehicle plying on the opposite lane of road 104. Other examples of obstacles 106 may include, but are not limited to debris, a permanent structure, a tree, a human or an accident site. Obstacles 106 may suddenly appear and thus autonomous vehicle 102 needs to be controlled in order to avoid collision with any obstacle 106 and, while doing so, maintaining good ride experience for passengers sitting inside autonomous vehicle 102. In FIG. 1, autonomous vehicle 102 is shown to be on current navigation path 108 and to avoid collision with obstacles 106a, 106b, and 106c, autonomous vehicle 102 may change to an alternate navigation path 110.

Figure 2:
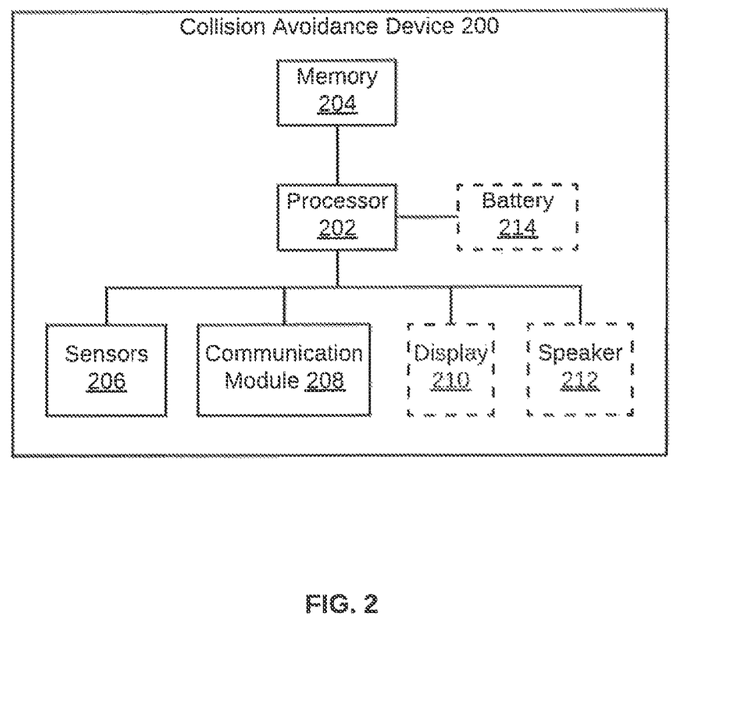
FIG. 2 illustrates a block diagram of a collision avoidance device for controlling an autonomous vehicle, in accordance with an embodiment.

Referring now to FIG. 2, a block diagram of a collision avoidance device 200 for controlling autonomous vehicle 102 is illustrated, in accordance with an embodiment. Collision avoidance device 200 may be integrated within autonomous vehicle 102. Alternatively, collision avoidance device 200 may be a mobile device that might be placed within autonomous vehicle 102 or may be controlling autonomous vehicle 102 from a remote location. In this case, examples of collision avoidance device 200 may include, but are not limited to a smart phone, a tablet, and a phablet. Additionally, when collision avoidance device 200 is a mobile device, it may communicate with autonomous vehicle 102 via a network (not shown in FIG. 2). Examples of the network may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Collision avoidance device 200 includes a processor 202 that is coupled to a memory 204. Memory 204 stores instructions for processor 202, which, on execution, causes processor 202 to perform desired operations. Memory 204 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Various module in memory 204 are further explained in detail in conjunction with FIG. 3.

Collision avoidance device 200 may further include sensors 206 to evaluate various parameters of autonomous vehicle 102. Collision avoidance device 200 may also communicate with external sensors (not shown in FIG. 2) that are integrated within autonomous vehicle 102 and capture obstacle information for obstacles 106 and vehicle information associated with autonomous vehicle 102. The obstacle information associated with an obstacle may include, but is not limited to location of the obstacle, velocity of the obstacle, size of the obstacle, orientation of the obstacle, direction of movement of the obstacle, shape dynamicity of the obstacle, or material of the obstacle. The vehicle information may include, but is not limited to size and shape of autonomous vehicle 102, current loaded weight of autonomous vehicle 102, tire pressure, tire condition, age of autonomous vehicle 102, or brake condition.

Examples of sensor 206 and the external sensors may include, but are not limited to a camera (a depth camera, an infrared light camera, a visible light camera, or a position tracking camera), a 3D inclinometer sensor, accelerometer, gyroscope, pressure sensor, heat sensor, ambient light sensor, a compass, variometer, a tactile sensor, and a Global Positioning System (GPS) sensor. By way of an example, a gyroscope and/or an accelerometer may be used to detect sudden deceleration or acceleration of autonomous vehicle 102.

Collision avoidance device 200 may communicate with the external sensors or any vehicle management system onboard autonomous vehicle 102 via a communication module 308, which may support multiple communication protocols. Examples of these communication protocols may include, but are not limited to WLAN, Wi-Fi, LTE, WMAX, GPRS, Bluetooth, Zigbee, Infrared, NearBytes, and NFC.

To issue notifications or warnings, collision avoidance device 200 may also include a display 210 and a speaker 212 (coupled to processor 202). Display 210 may be a touch screen that enables passenger to interact with collision avoidance device 200. Display 210, for example, may be a Plasma display, a Liquid Crystal Display (LCD), a Light Emitting Diode (LED) display, an Organic Light Emitting Diode (OLED) display, and an Active Matrix OLED (AMOLED) display. Lastly, collision avoidance device 200 may also include a battery 214 in order to work independent of a power source, when collision avoidance device 200 is a mobile device independent of autonomous vehicle 102.

Figure 3:
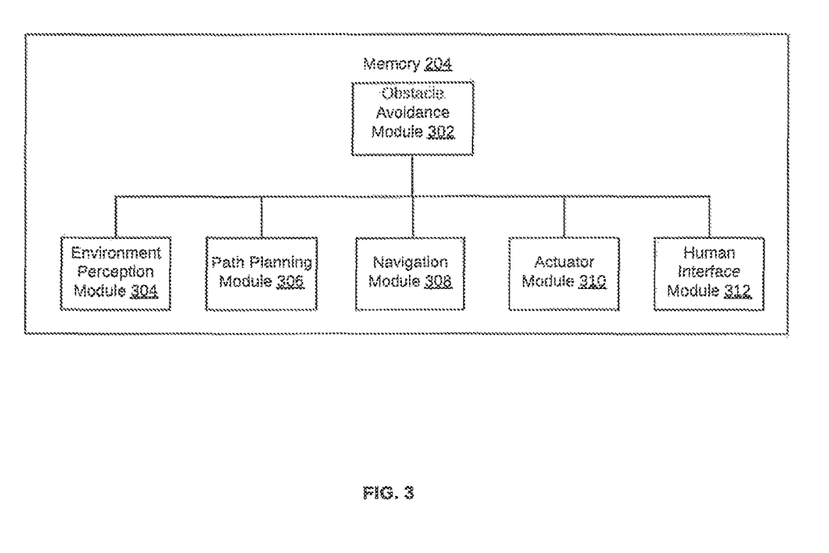
FIG. 3 illustrates a block diagram of various modules in a memory of a collision avoidance device configured for controlling an autonomous vehicle, in accordance with an embodiment.

Various functionalities performed by collision avoidance device 200 are further explained in detail in conjunction with FIG. 3 illustrating various modules within memory 204.

Referring now to FIG. 3, a block diagram of various modules within memory 204 of collision avoidance device 200 that is configured to control autonomous vehicle 102 is illustrated, in accordance with an embodiment. Memory 204 includes an obstacle avoidance module 302, an environment perception module 304, a path planning module 306, a navigation module 308, an actuator module 310, and a human interface module 312.

Environment perception module 304 collects, fuses, and interprets sensor data received from sensors 206, the external sensors, and/or the external sources (for example, vehicle management systems onboard autonomous vehicle 102). The information collated by environment perception module 304 is used to develop map representation that is further used by path planning module 306. The map representations are dynamically updated and include information on location of autonomous vehicle 102 with respect to terrain and obstacles 106.

Navigation module 308 receives the obstacle information from obstacle avoidance module 302 and determines velocity and the current navigation path for autonomous vehicle 102. Navigation module 308 shares the vehicle navigation information with obstacle avoidance module 302 in order to control the velocity of autonomous vehicle 102 for obstacle avoidance. Based on inputs received from environment perception module 304 and navigation module 308, path planning module 306 determines one or more alternate navigation paths that autonomous vehicle 102 can ply on in order to avoid colliding with an obstacle. This is further explained in detail in conjunction with FIGS. 4, 5A, and 5B.

Actuator module 310 receives the velocity and navigation path modification information from navigation module 308 and path planning module 306. Based on this information, actuator module 310 makes decision on steering autonomous vehicle 102. Actuator module 310 also shares the feedback of odometer (distance travelled with a given velocity) with navigation module 308. This is further explained in detail in conjunction with FIGS. 4, 5A, and 5B. Human interface module 312 enables passengers to provide visual, auditory, and navigational support to collision avoidance module 200.

Information received from environment perception module 304, path planning module 306, navigation module 308, actuator module 310, and human interface module 312, obstacle avoidance module 302 gathers obstacle information associated with an obstacle around a current navigation path of autonomous vehicle 102 and vehicle information associated with autonomous vehicle 102. Thereafter, obstacle avoidance module 302 determines a relative velocity and a collision distance between the obstacle and autonomous vehicle 102 and an obstacle state of the obstacle based on an analysis of the obstacle information and the vehicle information. Obstacle avoidance module 302 then computes a collision factor based on the relative velocity and the obstacle state. When the collision factor is above a collision threshold and one or more alternate navigation paths are not available, obstacle avoidance module 302 stops autonomous vehicle 102 before the collision distance is exhausted.

When the collision factor is above the collision threshold and one or more alternate navigation paths are available, obstacle avoidance module 302 modifies the current navigation path of autonomous vehicle 102 to one of the one or more alternate navigation paths. However, when the collision factor is less than or equal to the collision threshold, obstacle avoidance module 302 instructs autonomous vehicle 102 to pass over the obstacle. This is further explained in detail in conjunction with FIGS. 4, 5A, and 5B Referring now to FIG. 4, a flowchart of a method for controlling autonomous vehicle 102 to avoid collision is illustrated, in accordance with an embodiment. To initialize collision avoidance device 200, if it is the first instance of using collision avoidance device 200, it first retrieves configuration parameters from a configuration database and maintains a local copy of these configuration parameters, i.e., local configuration, in memory 204. This is done when collision avoidance device 200 is being initialized for the first time. However, if collision avoidance device 200 is not being initialized for the first time, collision avoidance device 200 checks if there is any change in the configuration parameters stored in the configuration database when compared with the local copy of these configuration parameters. In case there is a change, collision avoidance device 200 updates the local copy with the new configuration parameters stored in the configuration database. If there is no change in the configuration parameters stored in the configuration database, collision avoidance device 200 loads the local copy of the configuration parameters.

Figure 4:
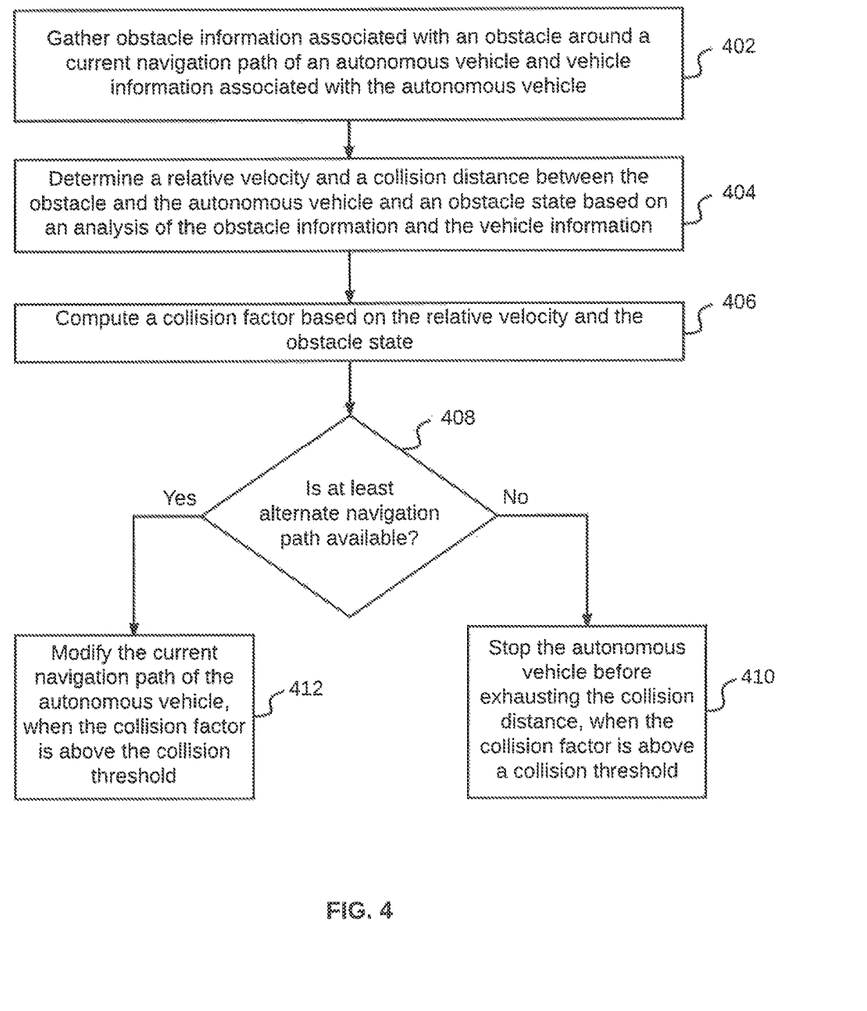
FIG. 4 illustrates a flowchart of a method for controlling an autonomous vehicle to avoid collision, in accordance with an embodiment.

The configuration parameters may include, but are not limited to a location deviation ($Loc_{Dev}$), a velocity deviation threshold factor ($Vel_{DevThFactor}$), and a collision impact threshold ($Obs_{CollImptTh}$) for an obstacle. The location deviation is used to determine the correct location of autonomous vehicle 102. The location of autonomous vehicle 102 may be determined using GPS data and static map data, such that, if deviation of the determined location when compared to the GPS location is more than the location deviation, location of autonomous vehicle 102 is corrected. Further, the velocity deviation threshold factor is used to determine the deviation between actual speed and calculated speed of autonomous vehicle 102. When this deviation is above or below the speed deviation threshold factor, speed of autonomous vehicle 102 needs to be recalculated. The collision impact threshold is the threshold value for calculating the collision impact of an obstacle. If the collision impact is above the obstacle collision impact threshold value, then autonomous vehicle 102 shall stop or avoid the obstacle instead of pass over.

Collision avoidance device 200 determines a current navigation path that is suitable for autonomous vehicle 102 to ply on from amongst a plurality of navigation paths. Once the current navigation path is determined, collision avoidance device 200 identifies a current location of autonomous vehicle 102 on the current navigation path as: $Veh_{Loc}$ and stores it in memory 204. Collision avoidance device 200 additionally identifies direction (or orientation) of autonomous vehicle 102 as: $Veh_{Dir}$, using data received from Inertial Measurement Unit (IMU) placed within autonomous vehicle 102. In an exemplary embodiment, to determine the current location of autonomous vehicle 102, collision avoidance device 200 first receives GPS data from an internal or external GPS, and determines location of autonomous vehicle 102 as: $Veh_{LocGPS}$. Thereafter, collision avoidance device 200 compares the $Veh_{Loc}$ with the $Veh_{LocGPS}$ and $Loc_{Dev}$, using equation 1 given below:

$$Veh_{Loc}<=Veh_{LocGPS}\pm Loc_{Dev} \qquad (1)$$

If the equation 1 is true, collision avoidance device 200 determines the current location of autonomous vehicle 102 as $Veh_{Loc}$. However, if the equation 1 is not true, collision avoidance device 200 determines the current location using equation 2 given below:

$$Veh_{Loc}=Veh_{LocGPS}\pm Loc_{Dev} \qquad (2)$$

Thereafter, collision avoidance device 200 receives driving environment information from sensors that may be installed within autonomous vehicle 102. By way of an example, collision avoidance device 200 uses the images captured by the cameras and processes them using any existing computer vision techniques or image analytics methods to detect one or more obstacles around autonomous vehicle 102. The driving environment information is analyzed to detect obstacles and obstacle information regarding detected obstacles is stored as: DetObs (i) and the total number of detected obstacles are stored as: Num_Obs in memory 204. Obstacle information may include, but is not limited to location of the obstacle, velocity of the obstacle, size of the obstacle, orientation of the obstacle, direction of movement of the obstacle, shape dynamicity of the obstacle, or material of the obstacle.

To detect an obstacle of interest or a potential obstacle from the detected obstacles, collision avoidance device 200 gathers obstacle information stored as DetObs (i) for each of the detected obstacle, such that the total number of detected obstacles, i.e., Num_Obs, is exhausted. Based on the obstacle information for each detected obstacle, collision avoidance device 200 determines distance of each detected obstacle from autonomous vehicle 102 as: $Obs_{dist}$ and distance of each obstacle on the current navigation path as: $Dist_{NavPath}$. Obstacles out of the detected obstacle, for which $Obs_{dist}=Dist_{NavPath}$, are identified as obstacles of interest or potential obstacles. These obstacles are on the current navigation path and may be hit by autonomous vehicle 102. These obstacles are represented as: ObsPot (i).

Thereafter, at step 402, collision avoidance device 200 gathers obstacle information associated with an obstacle, ObsPot (which is a potential obstacle) around the current navigation path of autonomous vehicle 102 and vehicle information associated with autonomous vehicle 102. Obstacle information is gathered for each obstacle that has been identified as a potential obstacle. Vehicle information may include, but is not limited to size and shape of autonomous vehicle 102, current loaded weight of autonomous vehicle 102, tire pressure, tire condition, age of autonomous vehicle 102, or brake condition. The vehicle information may be gathered from various sensors installed within autonomous vehicle 102.

At step 404, collision avoidance device 200 determines a relative velocity and a collision distance between the obstacle and autonomous vehicle 102, based on an analysis of the obstacle information and the vehicle information. To determine the relative velocity, collision avoidance device 200 first determines speed of the obstacle as: SpeedObs, and the current speed of autonomous vehicle 102 as: SpeedCurVel. The collision distance for the obstacle is determined using the obstacle information as: $Obs_{dist}$. Collision avoidance device 200, based on the analysis, additionally determines an obstacle state of the obstacle as: $Obs_{DynState}$. The obstacle state includes one or more of, but is not limited to location, velocity, shape, or size. The determination of relative velocity, the collision distance, and the obstacle state is repeated for each obstacle that has been identified as a potential obstacle.

At step 406, collision avoidance device 200 computes a collision factor for the obstacle based on the relative velocity and the obstacle state and saves it as: CollFact. The collision factor is computed as a function of the relative velocity and the obstacle state. Similarly, a collision factor is computed for each obstacle that has been identified as a potential obstacle. In an exemplary embodiment, the CollFact for the obstacle may be computed using the equation 3 given below:

$$CollFact=Fn(SpeedObs,SpeedCurVel) \quad (3)$$

When the collision factor is above the collision impact threshold, i.e., the $Obs_{CollmptTh}$, collision avoidance device 200, at step 408, performs a check to determine whether one or more alternate navigation paths are available or not for plying autonomous vehicle 102. This determination is made based on location of a plurality of additional obstacles that exclude the obstacle and obstacle information associated with each of the plurality of additional obstacles. When one or more alternate paths are not available, collision avoidance device 200, at step 410, stops autonomous vehicle 102 before exhausting the collision distance, i.e., $Obs_{dist}$. To this end, based on the relative velocity and the collision distance, collision avoidance device 200 determines a vehicle deceleration that autonomous vehicle 102 should achieve to stop before exhausting the collision distance as: AchDclr. Thereafter, a further determination is made as to whether autonomous vehicle 102 would be able to achieve the required vehicle deceleration in order to stop autonomous vehicle 102, considering SpeedCurVel and $Obs_{Dist}$. In an embodiment, collision avoidance device 200 also needs to determine that the $Obs_{DynState}$ is static, for autonomous vehicle 102 to stop. When all the above discussed factors are determined, collision avoidance device 200 instructs autonomous vehicle 102 to stop at a deceleration of AchDclr.

Referring back to step 408, if one or more alternate navigation paths are available for autonomous vehicle 102 to ply on, collision avoidance device 200, at step 412, modifies the current navigation path of autonomous vehicle 102 to one of the one or more alternate navigation paths. Collision avoidance device 200 additionally needs to determine that the $Obs_{DynState}$ of the obstacle is static, for autonomous vehicle 102, in order to modify the current navigation path to one of the one or more alternate navigation paths.

Collision avoidance device 200 also determines the remaining time for a collision to occur between the obstacle and autonomous vehicle 102, considering that autonomous vehicle 102 neither decelerates nor modifies the current navigation path. Collision avoidance device 200 thereafter determines the deceleration or acceleration that can be achieved by autonomous vehicle 102 as: AchAclrRtdr, based on analysis of the vehicle information and the remaining time for the collision. Accordingly, based on the AchAclrRtdr and the remaining time for the collision, collision avoidance device 200 selects an alternate navigation path that autonomous vehicle 102 should shift to in order to avoid collision.

In an embodiment, when the collision factor is less than or equal to the collision impact threshold, i.e., the $Obs_{CollmptTh}$, collision avoidance device 200 instructs autonomous vehicle 102 to pass over the obstacle. This is further explained in detail in conjunction with FIGS. 5A and 5B.

Velocity calculated for autonomous vehicle 102 at various steps may be further assessed and corrected, when required, in order to determine the actual velocity. In an exemplary embodiment, velocity of autonomous vehicle 102 calculated at any given step, i.e., $Vel_{Calc}$, is assessed and corrected, when required. The actual velocity, received as encoder feedback, achieved by autonomous vehicle 102 is $Vel_{Act}$. Based on these velocities, collision avoidance device 200 calculates a velocity deviation factor, i.e., $Vel_{DevFactor}$, using the equation 4 given below:

$$Vel_{DevFactor}=(Vel_{Calc}-Vel_{Act})/Vel_{Calc} \quad (4)$$

Thereafter, collision avoidance device 200 assesses the $Vel_{DevFactor}$ with a velocity deviation threshold factor, i.e., $Vel_{DevThFactor}$, and a deviation adjustment factor, i.e., $DevAdj_{Fact}$, using the equation 5 given below. $Vel_{DevThFactor}$ is determined based on the maximum and minimum speeds that autonomous vehicle 102 may achieve. The $Vel_{DevThFactor}$ may vary based on different speed ranges. The $DevAdj_{Fact}$ varies depending on the deviation of actual encoder feedback and the $Vel_{Calc}$:

$$Vel_{DevThFactor}+DevAdj_{Fact}<=Vel_{DevFactor}<Vel_{DevThFactor}-DevAdj_{Fact} \quad (5)$$

When the equation (5) is true, $Vel_d$ is determined as the velocity of autonomous vehicle 102. However, when the equation (5) is not true, $DevAdj_FU$, which is the dynamically changing factor to adjust the velocity of autonomous vehicle 102, is used to determine the velocity of autonomous vehicle 102 using the equation 6 given below:

$$Vel_{ReCalc}=Vel_{Calc}+Vel_{CorrFact} \quad (6)$$

where, $Vel_{ReCalc}$ is the velocity determined for autonomous vehicle 102, $Vel_{CorrFact}$ is determined based on $DevAdj_{Fact}$.

Figure 5A:
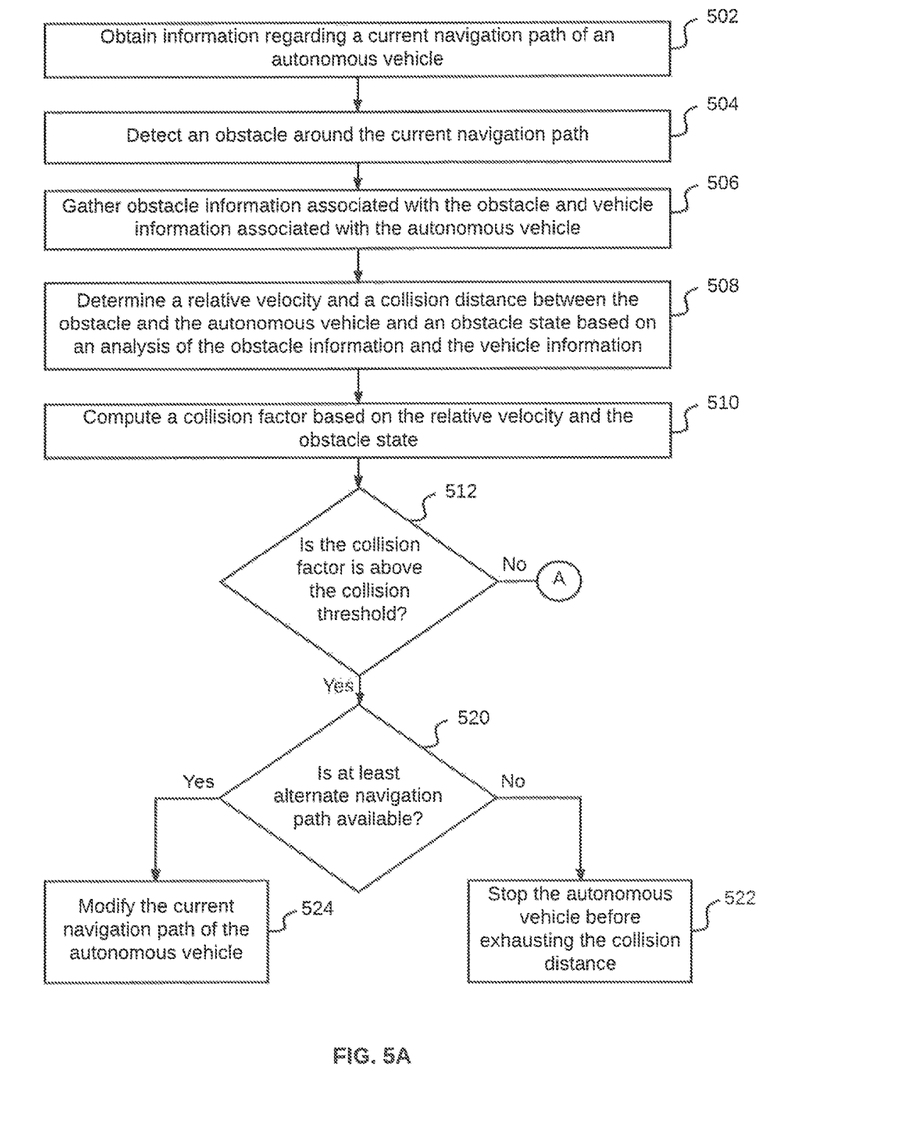
FIGS. 5A and 5B illustrate a flowchart of a method for controlling an autonomous vehicle to avoid collision, in accordance with another embodiment.
Figure 5B:
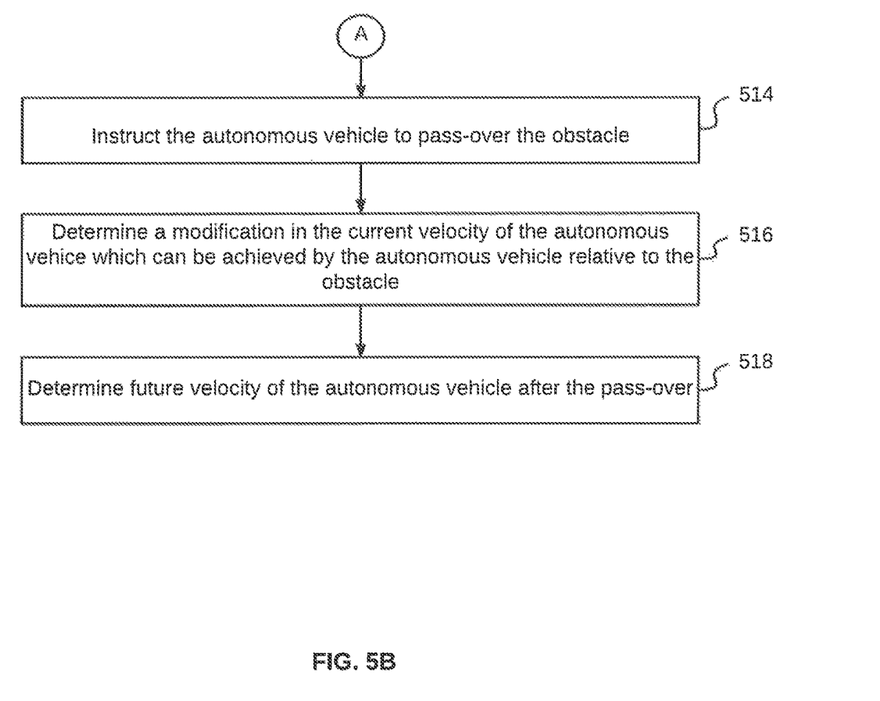

Referring now to FIGS. 5A and 5B, flowchart of a method for controlling autonomous vehicle 102 is illustrated, in accordance with another embodiment. At step 502, collision avoidance device 200 obtains information regarding a current navigation path of autonomous vehicle 102. Thereafter, at step 504, collision avoidance device 200 detects one or more obstacles around the current navigation path, which may act as potential obstacles. At step 506, collision avoidance device 200 gathers obstacle information associated with the one or more obstacles and vehicle information associated with autonomous vehicle 102. This has been explained in detail in conjunction with FIG. 4.

Thereafter, at step 508, collision avoidance device 200 determine a relative velocity and a collision distance between an obstacle and the autonomous vehicle and an obstacle state based on an analysis of the obstacle information and the vehicle information. A collision factor is then computed for the obstacle, at step 510, based on the relative velocity and the obstacle state. This has been explained in detail in conjunction with FIG. 4. At step 512, collision avoidance device 200 performs a check to determine whether the collision factor for the obstacle is above the collision impact threshold, i.e., $Obs_{CollmptTh}$. When the collision factor is less than or equal to the collision impact threshold, collision avoidance device 200, at step 514, instructs autonomous vehicle 102 to pass over the obstacle. To pass over the vehicle, collision avoidance device 102 needs to establish that the Dynamic state, i.e., $Obs_{DynState}$ of the obstacle is static and that autonomous vehicle 102 would be able to pass over the obstacle based on the obstacle information, which includes, but is not limited to shape, size, or material of the obstacle.

Once it is established that autonomous vehicle 102 can pass over the obstacle, collision avoidance device 200, at step 516, determines a modification in the current velocity of autonomous vehicle 102, which can be achieved by autonomous vehicle 102 relative to the obstacle, based on the analysis of the vehicle information. Modification in the current velocity may either be by way of acceleration or deceleration of autonomous vehicle 102 and is represented as: AchAclrRtdr.

Thereafter, at step 518, collision avoidance device 200, determines a future velocity of autonomous vehicle 102 after the pass over, which may be represented as: $Vel_{PostPass}$. The future velocity is determined based on the collision distance, the current velocity of autonomous vehicle 102, and the modification in the current velocity. In an exemplary embodiment, the future velocity may be determined using the equation 7 given below:

$$Vel_{PostPass} = fn(SpeedCurVel, Obs_{dist}, AchAclrRtdr) \quad (7)$$

Referring back to step 512, when the collision factor is greater than the collision impact threshold, collision avoidance device 102 performs steps 520 to 524, which have already been explained in detail in conjunction with FIG. 4.

Figure 6:
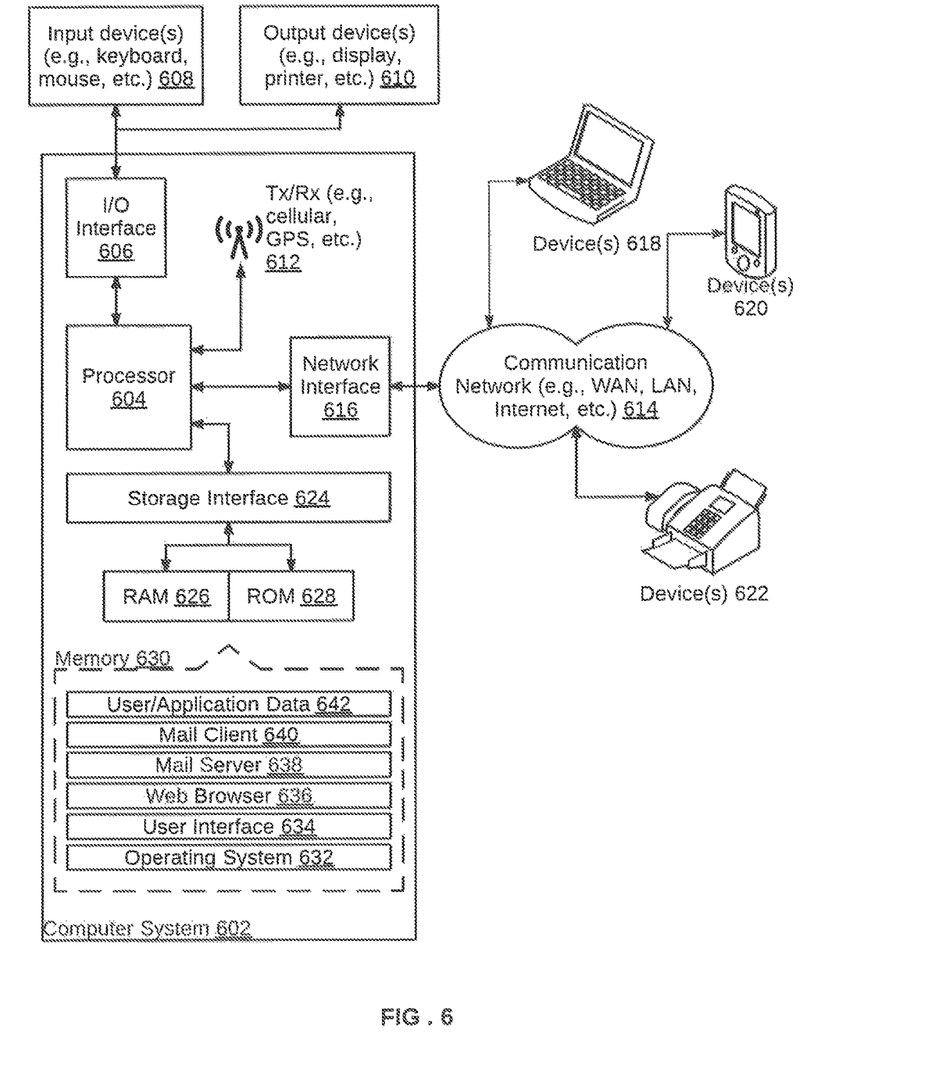
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user- or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXAS® INSTRUMENTS WILINK WL1283® transceiver, BROADCOM® BCM45501UB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical User Interfaces (GUIs) may be employed, including, without limitation, Apple® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide autonomous vehicles with collision avoidance device and method thereof. Collision avoidance system or device provides mechanism to avoid one or more obstacle by modifying the current navigation path and shifting to an alternate navigation path. Moreover, collision avoidance system also provides mechanism to avoid or overcome an obstacle that has dynamic characteristics by control speed of the automated vehicle and/or by modifying the current navigation path.

The specification has described autonomous vehicles with collision avoidance device and method thereof. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store. instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of controlling an autonomous vehicle, the method comprising:
    gathering, by a collision avoidance device, obstacle information associated with an obstacle around a current navigation path of the autonomous vehicle and vehicle information associated with the autonomous vehicle;
    determining, by the collision avoidance device, a relative velocity and a collision distance between the obstacle and the autonomous vehicle and an obstacle state of the obstacle based on an analysis of the obstacle information and the vehicle information;
    computing, by the collision avoidance device, a collision factor based on the relative velocity and the obstacle state;
    stopping the autonomous vehicle, by the collision avoidance device, before exhausting the collision distance, when the collision factor is above a collision threshold and at least one alternate navigation path is not available; and
    modifying, by the collision avoidance device, the current navigation path of the autonomous vehicle, when the collision factor is above the collision threshold and the at least one alternate navigation path is available.

2. The method of claim 1 further comprising instructing the autonomous vehicle to pass over the obstacle, when the collision factor is less than or equal to the collision threshold.

3. The method of claim 2, wherein instructing the autonomous vehicle to pass over the obstacle comprises determining a modification in current velocity of the autonomous vehicle relative to the obstacle based on the analysis of the vehicle information, wherein the modification in the current velocity comprises one of acceleration or deceleration.

4. The method of claim 3 further comprising determining future velocity of the autonomous vehicle after the pass over based on the collision distance, the current velocity, and the modification in the current velocity.

5. The method of claim 1 further comprising determining total number of obstacles within surrounding environment of the autonomous vehicle.

6. The method of claim 1, wherein the obstacle is one of a vehicle, debris, a permanent structure, a tree, a human or an accident site.

7. The method of claim 1, wherein the obstacle information comprises at least one of location of the obstacle, velocity of the obstacle, size of the obstacle, orientation of the obstacle, direction of movement of the obstacle, shape dynamicity of the obstacle, or material of the obstacle.

8. The method of claim 1, wherein the vehicle information comprises at least one of size and shape of the autonomous vehicle, current loaded weight of the autonomous vehicle, tire pressure, tire condition, age of the autonomous vehicle, or brake condition.

9. The method of claim 1, wherein stopping the autonomous vehicle comprises determining a vehicle deceleration based on the relative velocity and the collision distance, the vehicle deceleration enabling the autonomous vehicle to stop before exhausting the collision distance.

10. The method of claim 1 further comprising determining availability of the at least one navigation path for the autonomous vehicle based on the vehicle information, location of a plurality of additional obstacles that exclude the obstacle, and the obstacle information associated with each of the plurality of additional obstacles.

11. A collision avoidance device for controlling an autonomous vehicle, the collision avoidance device comprising:
    a processor; and
    a memory communicatively coupled to the processor, the at least one first camera, and the at least one second camera, wherein the memory stores processor instructions, which, on execution, causes the processor to:
        gather obstacle information associated with an obstacle around a current navigation path of the autonomous vehicle and vehicle information associated with the autonomous vehicle;
        determine a relative velocity and a collision distance between the obstacle and the autonomous vehicle and an obstacle state of the obstacle based on an analysis of the obstacle information and the vehicle information;
        compute a collision factor based on the relative velocity and the obstacle state;
        stop the autonomous vehicle before exhausting the collision distance, when the collision factor is above a collision threshold and at least one alternate navigation path is not available; and
        modify the current navigation path of the autonomous vehicle, when the collision factor is above the collision threshold and the at least one alternate navigation path is available.

12. The collision avoidance device of claim 11, wherein the processor instructions further cause the processor to instruct the autonomous vehicle to pass over the obstacle, when the collision factor is less than or equal to the collision threshold.

13. The collision avoidance device of claim 12, wherein to instructing the autonomous vehicle to pass over the obstacle, the processor instructions further cause the processor to determine a modification in current velocity of the autonomous vehicle relative to the obstacle based on the analysis of the vehicle information, wherein the modification in the current velocity comprises one of acceleration or deceleration.

14. The collision avoidance device of claim 13, wherein the processor instructions further cause the processor to determine future velocity of the autonomous vehicle after the pass over based on the collision distance, the current velocity, and the modification in the current velocity.

15. The method of claim 1, wherein the obstacle is one of a vehicle, debris, a permanent structure, a tree, a human or an accident site.

16. The collision avoidance device of claim 11, wherein the obstacle information comprises at least one of location of the obstacle, velocity of the obstacle, size of the obstacle, orientation of the obstacle, direction of movement of the obstacle, shape dynamicity of the obstacle, or material of the obstacle.

17. The collision avoidance device of claim 11, wherein the vehicle information comprises at least one of size and shape of the autonomous vehicle, current loaded weight of the autonomous vehicle, tire pressure, tire condition, age of the autonomous vehicle, or brake condition.

18. The collision avoidance device of claim 11, wherein to stop the autonomous vehicle, the processor instructions further cause the processor to determine a vehicle deceleration based on the relative velocity and the collision distance, the vehicle deceleration enabling the autonomous vehicle to stop before exhausting the collision distance.

19. The collision avoidance device of claim 11, wherein the processor instructions further cause the processor to determine availability of the at least one navigation path for the autonomous vehicle based on the vehicle information, location of a plurality of additional obstacles that exclude the obstacle, and the obstacle information associated with each of the plurality of additional obstacles.

20. A non-transitory computer-readable storage medium having stored thereon, a set of computer-executable instructions causing a computer comprising one or more processors to perform steps comprising:
- gathering, by a collision avoidance device, obstacle information associated with an obstacle around a current navigation path of the autonomous vehicle and vehicle information associated with the autonomous vehicle;
- determining, by the collision avoidance device, a relative velocity and a collision distance between the obstacle and the autonomous vehicle and an obstacle state of the obstacle based on an analysis of the obstacle information and the vehicle information;
- computing, by the collision avoidance device, a collision factor based on the relative velocity and the obstacle state;
- stopping the autonomous vehicle, by the collision avoidance device, before exhausting the collision distance, when the collision factor is above a collision threshold and at least one alternate navigation path is not available; and
- modifying, by the collision avoidance device, the current navigation path of the autonomous vehicle, when the collision factor is above the collision threshold and the at least one alternate navigation path is available.

* * * * *